R. B. PRICE.
MANUFACTURE OF HOLLOW RUBBER ARTICLES.
APPLICATION FILED APR. 19, 1915.
1,209,644.
Patented Dec. 19, 1916.
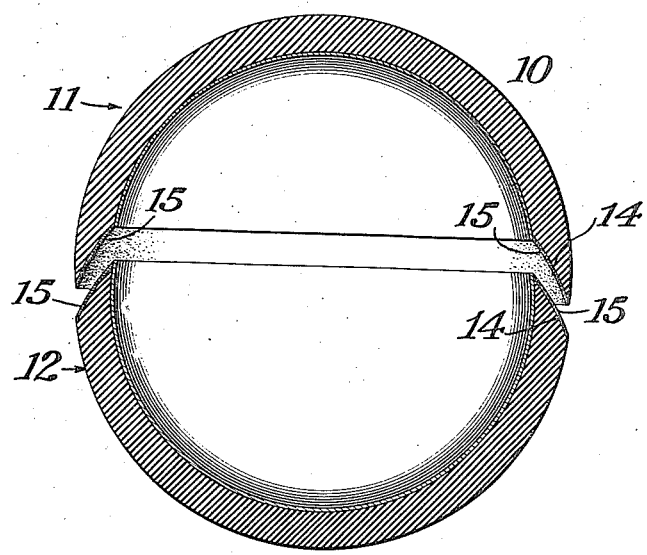
Inventor
RAYMOND B. PRICE
By his Attorney
Ernest Hopkinson

UNITED STATES PATENT OFFICE.

RAYMOND B. PRICE, OF NEW YORK, N. Y., ASSIGNOR TO RUBBER REGENERATING COMPANY, A CORPORATION OF INDIANA.

MANUFACTURE OF HOLLOW RUBBER ARTICLES.

1,209,644.      Specification of Letters Patent.      Patented Dec. 19, 1916.

Application filed April 19, 1915. Serial No. 22,305.

*To all whom it may concern:*

Be it known that I, RAYMOND B. PRICE, a citizen of the United States, and a resident of New York, county of New York, and State of New York, have invented certain new and useful Improvements in the Manufacture of Hollow Rubber Articles, of which the following is a full, clear, and exact description.

My invention relates to the manufacture of hollow rubber articles and more particularly to the type having elastic or yielding walls, and has for its object to produce such articles by a more economical and expeditious method, as well as to produce a better product than hitherto obtainable.

In the manufacture of hollow rubber articles, such as for instance tennis balls, the article is formed from rubber compound which is reduced to the required gage and shaped to conform to the walls of the mold sections. These sections are then brought together while the rubber is in its green state thereby bringing the adjacent sections of the article into intimate contact so they will be united to form the completed article. The mold is subjected to heat until the article is completely vulcanized.

My present invention contemplates an advantageous departure from the above described method of manufacturing hollow rubber articles, and produces first, a practical method of utilizing what is customarily known as cold curing to weld the joints of the shaped sections of the hollow article together, second, a practical method of rendering the wall of the hollow rubber article impervious to leakage, and third, to a process for producing a hollow rubber article at a less cost and with greater speed than hitherto obtainable.

With the above and other objects in view the invention consists in the novel method of manufacture as well as the novel details of construction and combinations of parts hereinafter fully described and pointed out in the appended claims, it being understood that various modifications may be resorted to within the scope of the appended claims without departing from the spirit or sacrificing any of the advantages of the invention.

The invention can be readily understood from the following description taken in connection with the accompanying drawing, in which the figure is a sectional view of a globular hollow rubber article constructed in accordance with my invention.

In the present instance, the article is shown as a ball 10, but it is obvious that many other articles may be made according to my invention. The ball may be stamped out in sections, and for the purpose of illustration, in the present embodiment the ball is shown to be composed of two hemispherical sections 11 and 12, and preferably the confronting edges of the sections are arranged to interfit, as for instance, by beveling, as shown at 14. The beveled edges are then faced with a skin 15 of rubber, preferably pure Para with no or at least very little sulfur or other vulcanizing agents associated therewith. The sections are now placed in corresponding molds and vulcanized partially or wholly as may be desired, the sulfur or other vulcanizing agent contained in the sections permeating the skin rubber 15 sufficiently to effect a union so that the skin will be inseparable from, or in other words, cannot be stripped from the corresponding section, while at the same time will be sufficiently adhesive as to approximate substantially raw or green rubber in consistency at the exposed face or surface. After the sections have been vulcanized or partially vulcanized as the case may be, the surface of the rubber skins 15 are moistened preferably with sulfur chlorid solution, and the two parts forced together. This preferably is done in an atmosphere of compressed gas in order that the finished product will be an inflated hollow rubber article, or may be performed in the open air and the compressed gas may be later forced into the interior of the article, by a hypodermic needle or similar device.

In the event of the article being only partially cured before the sections are joined together, the sections may be assembled and the article cured in a vulcanizer, in the presence of hot fluid pressure. This results in reducing the time and number of molds used, since by this means a number of articles may be vulcanized at one time, without molds, the molds being simply initially used in the first stamping-out process and for a sufficient period of time to stiffen the stock for removal therefrom preparatory to the sections being assembled and united as above described.

I do not wish to limit myself to the nature of the material composing the article as the material may be other than a vulcanizable plastic, as for instance balata or other suitable substance, which is set rather than vulcanized by the application of heat or other setting medium.

It may not be necessary in all instances to confine the article, or sections thereof, within rigid or in fact any walls, and I do not wish to limit myself in this particular.

What is claimed is:

1. A method of making hollow articles which consists in forming the wall of the article of sections of vulcanizable plastic material, applying a plastic skin having no or at least very little sulfur to the confronting edges of respective sections, vulcanizing said sections, moistening said skins with sulfur chlorid, and assembling and uniting the sections by pressing the moistened skins together.

2. A method of making hollow articles which consists in forming the wall of the article of sections of vulcanizable plastic material, applying plastic skin having no or at least very little sulfur to the confronting edges of respective sections, partially vulcanizing the sections, moistening said skins with sulfur chlorid, assembling and uniting the sections to form the final product by pressing the moistened skins together, and finally vulcanizing the product.

Signed at New York, N. Y., April 16th, 1915.

RAYMOND B. PRICE.